(12) United States Patent
Hahn

(10) Patent No.: US 8,101,258 B2
(45) Date of Patent: Jan. 24, 2012

(54) HIGH DENSITY INFORMATION STORAGE MEDIUM HAVING PLASMONIC NANO DEVICE

(75) Inventor: Jae Won Hahn, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 481 days.

(21) Appl. No.: 12/412,587

(22) Filed: Mar. 27, 2009

(65) Prior Publication Data

US 2010/0098897 A1   Apr. 22, 2010

(30) Foreign Application Priority Data

Oct. 22, 2008   (KR) .................. 10-2008-0103441

(51) Int. Cl.
   *B32B 3/02*   (2006.01)

(52) U.S. Cl. .............. 428/64.1; 428/64.4; 428/64.5; 428/64.6; 430/270.13

(58) Field of Classification Search ............... None
See application file for complete search history.

(56) References Cited

U.S. PATENT DOCUMENTS

2009/0297989 A1* 12/2009 Kobrin .................. 430/322

* cited by examiner

*Primary Examiner* — Elizabeth Mulvaney
(74) *Attorney, Agent, or Firm* — Venable LLP; Jeffri A. Kaminski

(57) ABSTRACT

A high density information storage medium includes a recording layer in which information is stored; a thin metal film placed on the recording layer and having a structure in which nano-apertures having a size of several nanometers to several hundred nanometers are defined at regular intervals; and a protective layer placed on the thin metal film. As light irradiated from above the protective layer passes through the nano-apertures, physical characteristics of the recording layer are changed, whereby information is stored.

12 Claims, 4 Drawing Sheets

HIGH DENSITY INFORMATION STORAGE MEDIUM HAVING PLASMONIC NANO DEVICE

CROSS-REFERENCES TO RELATED APPLICATION

The present application claims priority under 35 U.S.C. §119(a) to Korean application number 10-2008-0103441, filed on Oct. 22, 2008, in the Korean Intellectual Property Office, which is incorporated herein by reference in its entirety as set forth in full.

BACKGROUND

1. Technical Field

The present invention relates to an information storage medium, and more particularly, to a high density information storage medium which uses a metallic nano-aperture array.

2. Related Art

In general, the storage capacity of optical disks, which have been developed these days, is classified into a DVD (digital video disk) grade (4.7 GB) using a red laser and a BD (blue-ray disk) grade (25 GB) using a blue laser.

Recently, in order to store the signal flow of high density digital video as information, an information storage medium, which has capacity over 20 GB and a data transmission speed over 25 Mbps, is needed. Moreover, currently, as technology has been developed, information storing technique capable of recording information to realize the capacity of a terabyte CD (compact disk) is demanded.

In order to store information to high capacity, it is inevitably required to increase the storage density of an optical recording medium. The storage density of an optical recording medium can be increased by decreasing a record pitch.

The record pitch is proportional to the wavelength of a laser beam and is inversely proportional to the NA (numerical aperture) of an objective lens. Accordingly, in order to decrease the record pitch, a way of reducing the wavelength of a laser beam used for recording information or increasing the NA of an objective lens is mainly used.

However, the accomplishment of high density by the use of a short wavelength laser beam (a blue laser beam of 405 nm) and a high numerical aperture (NA=0.85) has theoretical and technical limits, and thus, a new way for realizing higher storage capacity is demanded in the art.

SUMMARY

A high density information storage medium which can increase the record density of information is described herein.

In one aspect, a high density information storage medium comprises a recording layer in which information is stored; a thin metal film placed on the recording layer and having a structure in which nano-apertures having a size of several nanometers to several hundred nanometers are defined at regular intervals; and a protective layer placed on the thin metal film, wherein, as light irradiated from above the protective layer passes through the nano-apertures, physical characteristics of the recording layer are changed, whereby information is stored.

BRIEF DESCRIPTION OF THE DRAWINGS

The above objects, and other features and advantages will become more apparent after a reading of the following detailed description taken in conjunction with the drawings, in which.

DETAILED DESCRIPTION

Hereafter, exemplary embodiments will be described with reference to the accompanying drawings.

Figure 1:
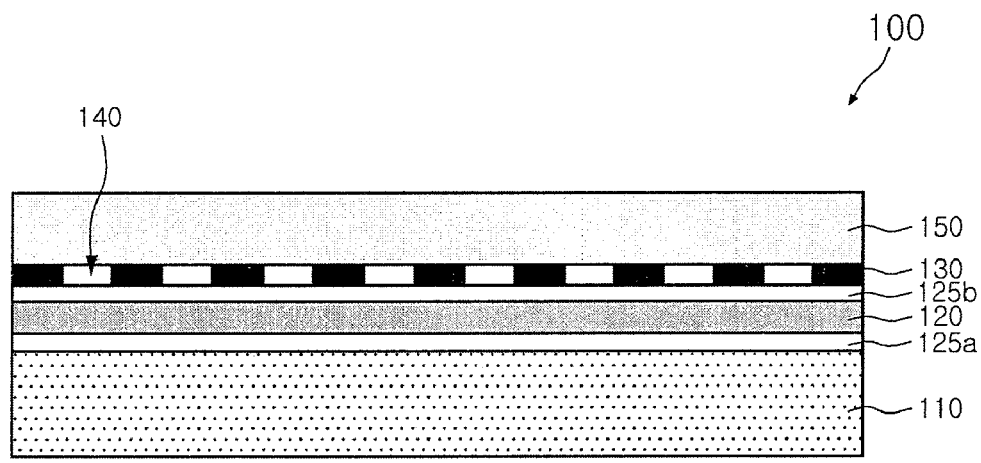
FIG. 1 is a sectional view illustrating a high density information storage medium in accordance with an embodiment of the present invention.

Referring to FIG. 1, an information storage medium 100 according to an embodiment of the present invention includes a substrate 110, a recording layer 120, a thin metal film 130 having nano-apertures 140, and a protective layer 150.

The substrate 110 can be made of glass, ceramic or resin. In particular, the substrate 110 can be formed of a material which is light in weight and has excellent injection moldability and low birefringence when emitting a laser beam, for example, such as polycarbonate.

The recording layer 120 serves as a layer on and from which information is recorded and reproduced. The recording layer 120 can comprise a phase change material layer such as GeSbTe and AgInSbTe or a semiconductor material layer such as Si, Ge and ZnO. Such recording layer 120 undergoes a reversible variation in terms of the index of refraction. The recording layer 120 can be formed as a single layer or multiple layers, and is required to have a thickness capable of reducing the noise level of a reproduced signal and securing sufficient recording sensitivity.

Dielectrics 125$a$ and 125$b$ can be formed on the upper and lower surfaces, respectively, of the recording layer 120. The dielectrics 125$a$ and 125$b$ function to physically and chemically protect the recording layer 120 and to prevent recorded information from degrading.

The thin metal film 130 can be formed of a material which can absorb less light in a wavelength band of light used for the storage and reading of information and can easily produce surface plasmon. In some cases, the thin metal film 130 can be opaque to light incident thereon. For example, when a light source having the wavelength of 400 nm is used, an aluminum (Al) film can be employed, and when a light source having the wavelength of 600 nm is used, a gold (Au) film can be employed. Here, the thickness of the thin metal film 130 can be determined by considering the transmittance and the thickness of the recording layer 120. For example, in the embodiment of the present invention, the thin metal film 130 can be formed to have a thickness of a few tens of nanometers and several hundreds nanometers.

As the nano-apertures 140 having a dimension of several nanometers to several hundred nanometers are designed to have high transmittance of incident light, producing small and bright light spots. The nano-apertures 140 can be designed by considering an information storing position on the recording layer 120. That is to say, the nano-apertures 140 can be defined to correspond to the information storing position and can be arranged at an interval of about 100 to 200 nm so that information can be recorded with high density. At this time, the interval can be determined within a range that allows focused lights not to overlap with one another in the nano-apertures 140. In other words, the interval of the nano-apertures 140 is determined within a range that allows lights reaching the recording layer 120 after passing through the nano-apertures 140 not to overlap with one another. The nano-apertures 140 can have various transverse sectional shapes such as of a bow tie, a letter 'C' and a letter 'H'.

The protective layer 150 is placed on the upper surface of the thin metal film 130. The protective layer 150 can be formed of a nonlinear optical material which has self-focusing effect that the index of refraction changes depending upon the intensity of incident light and of which nonlinear characteristics vary. If the protective layer 150 is formed of the nonlinear optical material, since the flux of light focused on the upper surface of the thin metal film 130 can be decreased, recording density can be increased.

If light is incident on the protective layer 150, self-focusing occurs in the nonlinear optical material, and the numerical aperture of an optical system (a focusing lens not shown) increases, so that the diameter of the flux of focused light can be decreased. The protective layer 150 can comprise a metal-dielectric composite such as $As_2S_3$, a-Si, InSb, $Cu-SiO_2$, $Ni-SiO_2$, $Cu-Ni-SiO_2$ and $Cu-Al_2O_3$, a semiconductor quantum dot dielectric composite material, or a composite material in which a compound of II-IV groups or a compound of III-V groups is dispersed in glass or resin.

Figure 2:
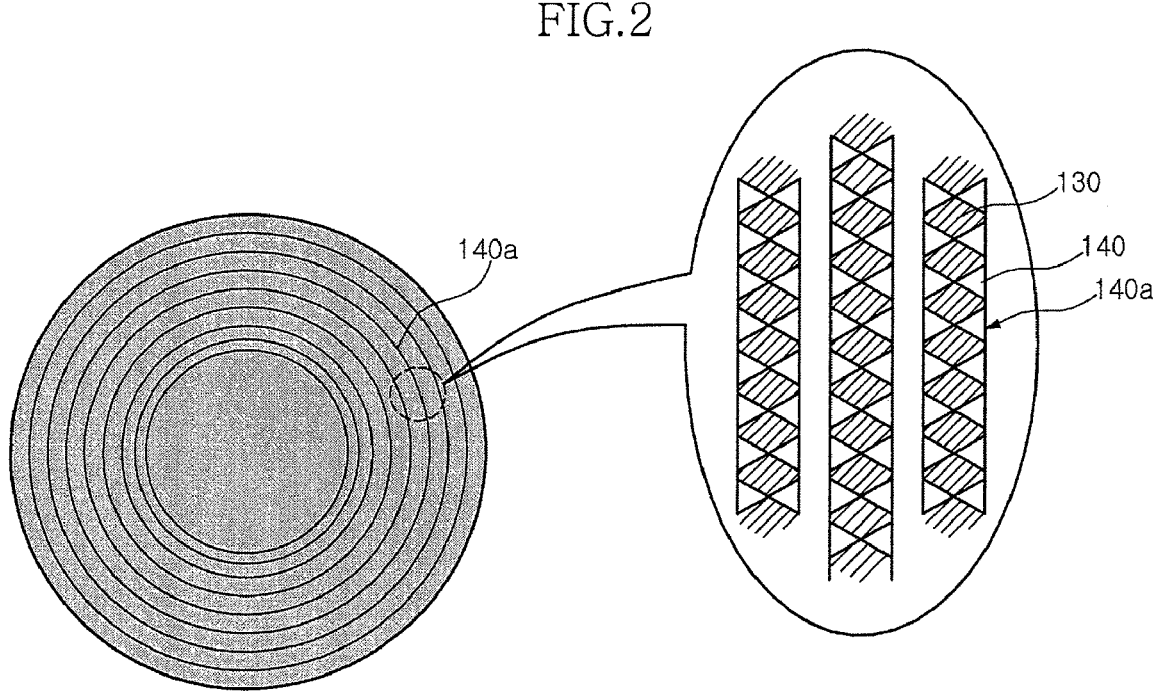
FIG. 2 is a plan view illustrating a compact disk in which a thin metal film defined with nano-apertures according to the embodiment of the present invention is adopted.

FIG. 2 is a plan view illustrating a compact disk in which the thin metal film defined with the nano-apertures according to the present invention is adopted.

Referring to FIG. 2, a compact disk 200 includes a plurality of nano-aperture arrays 140a which are arranged in the shape of tracks. Each nano-aperture array 140a can have a plurality of nano-apertures 140 which are continuously defined and have the transverse sectional shape of bow ties. The nano-aperture arrays 140a are located to correspond to respective information storage tracks. According to this, as tracks with a high contrast ratio are formed by the nano-apertures 140 regardless of whether information is stored in the tracks or not, information recording density can be increased and the pitch between tracks can be decreased.

In the information storage medium 100, information can be stored by focusing laser beams, and the position and the characteristic of information can be read out by the light reflected from the information storage medium 100.

Figure 3:
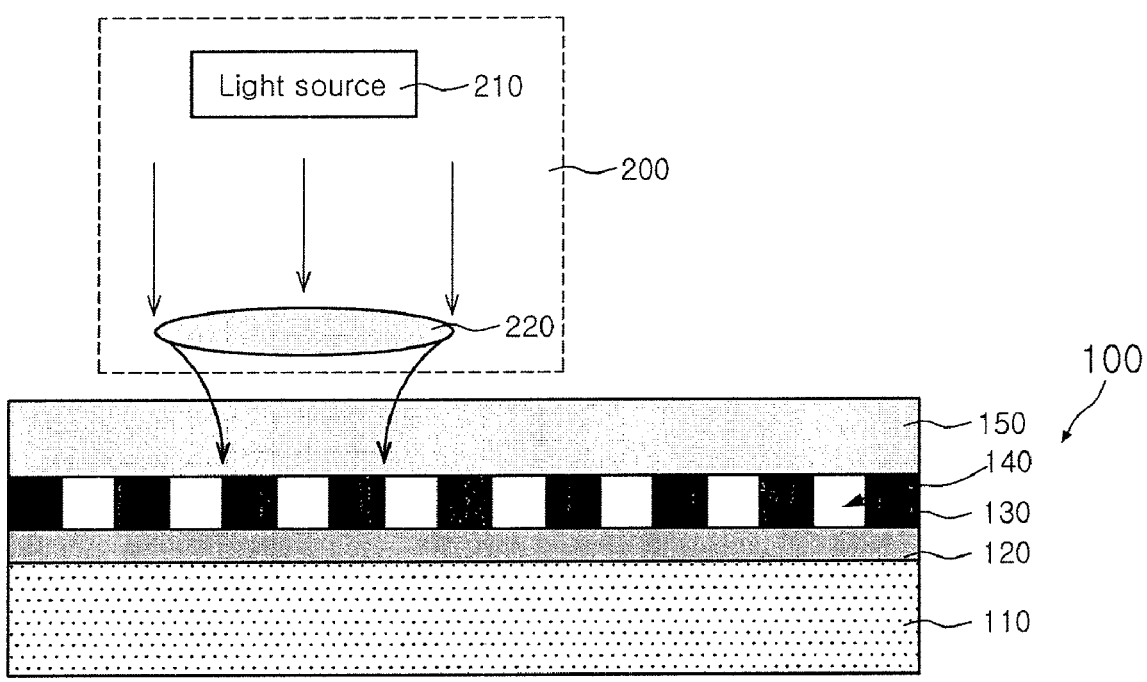
FIG. 3 is a view illustrating a method for storing information in the high density information storage medium according to the embodiment of the present invention.

Namely, the information storage medium 100 according to the embodiment can be mounted to a light pick-up device 200 shown in FIG. 3. The light pick-up device 200 can be constituted by an optical system including a light source 210 and a light focusing lens 220. Although not shown in the drawing, the optical pick-up device 200 can additionally include a member for supporting the information storage medium 100.

If a laser beam is irradiated from the light source 210, the focusing lens 220 focuses the irradiated laser beam and provides the focused laser beam to the information storage medium 100. At this time, the diameter of the light flux focused by the focusing lens 220 can be 30% to 40% greater than the pitch of the nano-apertures 140.

Here, if a strong laser beam is irradiated from the light pick-up device 200 to the information storage medium 100, focused powerful light is applied toward the lower ends of the nano-apertures 140, that is, toward the recording layer 120, by the surface plasma produced around the nano-apertures 140, such that the physical characteristic of the recording layer 120 is changed by the focused light and information is thereby stored. At this time, when information is stored using the light focused by the nano-apertures 140, the size of an area in which information is recorded may be a few tens of nanometers much smaller than the pitch (line width) of the nano-apertures 140, and this size can be changed by varying the intensity of the laser beam. That is to say, due to the fact that the thin metal layer 130 having the nano-apertures 140 is placed in the information storage medium 100, light having flux significantly increased when compared to actual incident light can be applied to the recording layer 120, whereby the energy of the laser beam required for storing information can be decreased. According to this, a data storing speed can be increased and the output of the laser beam can be reduced.

Figure 4:
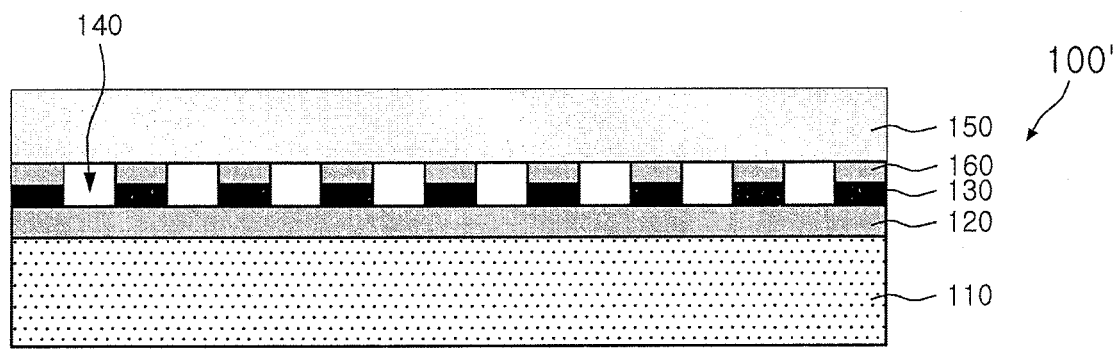
FIGS. 4 through 6 are sectional views illustrating high density information storage mediums in accordance with other embodiments of the present invention.

Also, as shown in FIG. 4, a different kind of metal film 160 can be additionally formed between the thin metal film 130 and the protective layer 150 so that the reflectance of the light reflected toward the lower ends of the nano-apertures 140 can be increased. The different kind of metal film 160 can comprise a metal film which is formed of chrome and nickel having excellent conductivity characteristics. By additionally forming the different kind of metal film 160 in this way, the contact characteristic between the materials of the protective layer 150 and the thin metal film 130 can be improved. Further, by the additional formation of the metal film 160, when stored information is subsequently analyzed, the reflectance of the light reflected from an information storing area can be increased.

Figure 5:
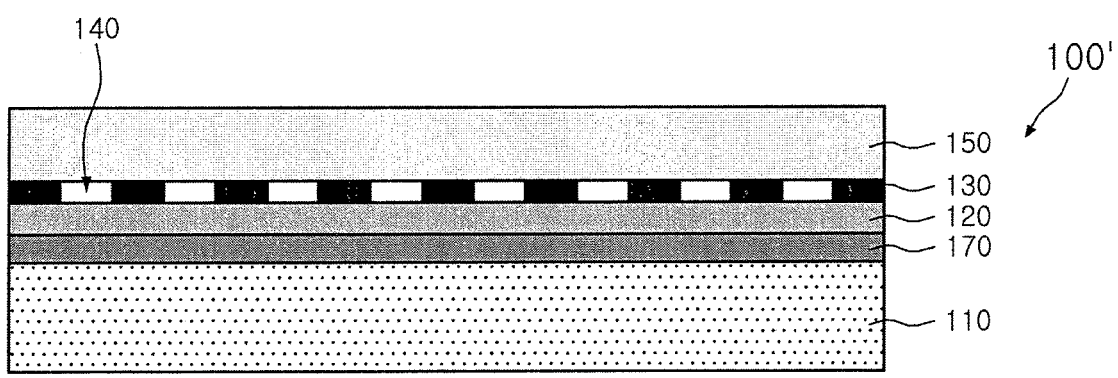
Figure 6:
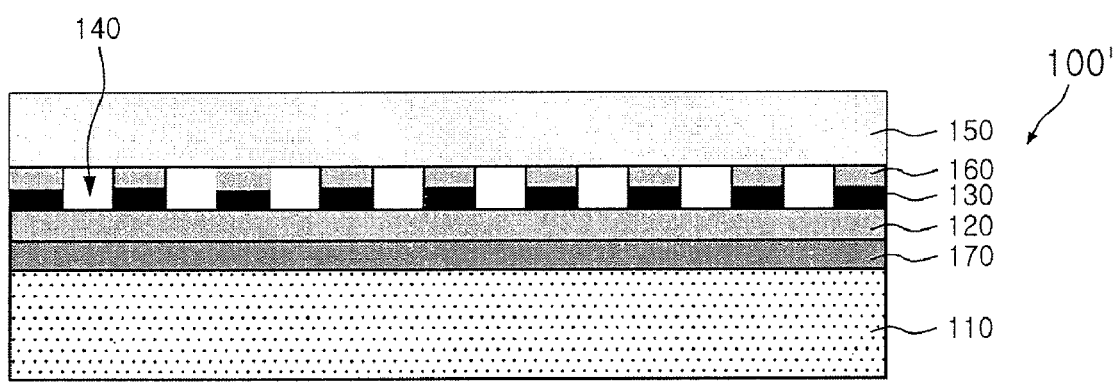

Moreover, as shown in FIGS. 5 and 6, a metal layer 170 (hereinafter referred to as a "lower metal layer") can be additionally interposed between the substrate 110 and the recording layer 120. The lower metal layer 170 can also be formed of chrome, nickel or aluminum having excellent reflection characteristics. By the additional interposition of the lower metal layer 170, light which is likely to be absorbed into the substrate 110 can be focused onto the recording layer 120, whereby the focusability of light can be improved and reflectance of light toward the lower ends of the nano-apertures 140 can be increased.

As is apparent from the above description, according to the present invention, a thin metal film having nano-apertures is formed in an information storage medium such as a CD, a DVD or a BD, so that, when irradiating light to store and read data, the light can be highly transmitted through the nano-apertures to a recording layer of the information storage medium. According to this, as the diameter of light flux is remarkably decreased by the surface plasmon produced underneath the nano-apertures, data recording density can be significantly increased. Further, even when reading data, a data storing position can be easily detected by analyzing the light reflected through the nano-apertures.

Although exemplary embodiments have been described for illustrative purposes, those skilled in the art will appreciate that various modifications, additions and substitutions are possible, without departing from the scope and the spirit as disclosed in the accompanying claims.

What is claimed is:

1. A high density information storage medium comprising:
a recording layer in which information is stored;
a thin metal film placed on the recording layer and having a structure in which nano-apertures having a size of several nanometers to several hundred nanometers are defined at regular intervals; and
a protective layer placed on the thin metal film,
wherein, as light irradiated from above the protective layer passes through the nano-apertures, physical characteristics of the recording layer are changed, whereby information is stored.

2. The high density information storage medium according to claim 1, wherein a substrate for supporting the recording layer is placed under the recording layer.

3. The high density information storage medium according to claim 1, wherein the thin metal film comprises a metal film which absorbs less light in a wavelength band of light used for storing information in the recording layer than in other wavelength bands.

4. The high density information storage medium according to claim 1, wherein the nano-apertures are defined to correspond to a data storing position on the recording layer.

5. The high density information storage medium according to claim 4, wherein the nano-apertures are continuously arranged to form the shape of a track in the thin metal film.

6. The high density information storage medium according to claim 4, wherein an interval of the nano-apertures is determined within a range that allows focused lights not to overlap with one another in the nano-apertures, that is, on the recording layer placed on lower ends of the nano-apertures.

7. The high density information storage medium according to claim 4, wherein the nano-apertures have a bow tie-shaped, a C-shaped or an H-shaped transverse section.

8. The high density information storage medium according to claim 1, wherein the protective layer is formed of a material which has nonlinear characteristics of self-focusing.

9. The high density information storage medium according to claim 8, wherein the protective layer comprises a metal-dielectric composite such as $As_2S_3$, a-Si, InSb, $Cu$—$SiO_2$, $Ni$—$SiO_2$, $Cu$—$Ni$—$SiO_2$ and $Cu$—$Al_2O_3$, a semiconductor quantum dot dielectric composite material, or a composite material in which a compound of II-IV groups or a compound of III-V groups is dispersed in glass or resin.

10. The high density information storage medium according to claim 2, wherein a different kind of metal film is additionally formed between the thin metal film and the protective layer.

11. The high density information storage medium according to claim 10, wherein a lower metal layer is additionally formed between the substrate and the recording layer.

12. The high density information storage medium according to claim 2, wherein a dielectric layer is interposed at least one of between the substrate and the recording layer and between the recording layer and the thin metal film.

* * * * *